(12) United States Patent
Hu et al.

(10) Patent No.: US 10,118,124 B2
(45) Date of Patent: Nov. 6, 2018

(54) INTEGRATED MEMBRANE-PYROLYSIS SYSTEMS AND METHODS

(71) Applicants: UT-Battelle, LLC, Oak Ridge, TN (US); ALLIANCE FOR SUSTAINABLE ENERGY, LLC, Golden, CO (US)

(72) Inventors: Michael Z. Hu, Knoxville, TN (US); Chaiwat Engtrakul, Louisville, CO (US); Brian L. Bischoff, Knoxville, TN (US); Mark F. Davis, Broomfield, CO (US)

(73) Assignees: UT-BATTELLE, LLC, Oak Ridge, TN (US); ALLIANCE FOR SUSTAINABLE ENERGY, LLC, Golden, CO (US)

( * ) Notice: Subject to any disclaimer, the term of this patent is extended or adjusted under 35 U.S.C. 154(b) by 68 days.

(21) Appl. No.: 15/415,370

(22) Filed: Jan. 25, 2017

(65) Prior Publication Data
US 2017/0209829 A1    Jul. 27, 2017

Related U.S. Application Data

(60) Provisional application No. 62/286,651, filed on Jan. 25, 2016, provisional application No. 62/364,477, filed on Jul. 20, 2016.

(51) Int. Cl.
*B01D 53/22*      (2006.01)
*B01D 71/02*      (2006.01)
(Continued)

(52) U.S. Cl.
CPC ......... *B01D 53/228* (2013.01); *B01D 63/063* (2013.01); *B01D 71/024* (2013.01);
(Continued)

(58) Field of Classification Search
CPC ........ B01D 53/228; B01D 2255/20707; B01D 2053/221; B01D 2255/504;
(Continued)

(56) References Cited

U.S. PATENT DOCUMENTS

| | | | | |
|---|---|---|---|---|
| 4,340,479 A | * | 7/1982 | Pall | B01D 61/145 210/490 |
| 4,340,480 A | * | 7/1982 | Pall | B01D 61/145 210/490 |

(Continued)

FOREIGN PATENT DOCUMENTS

WO    WO 2007/044009 A1    4/2007

OTHER PUBLICATIONS

Lu, Q. et al., "Catalytic upgrading biomass fast pyrolysis vapors with titania and zirconia/titania based catalysts", Fuel 89 (2010) 2096-2103.

(Continued)

*Primary Examiner* — Anthony R Shumate
(74) *Attorney, Agent, or Firm* — Scully Scott Murphy & Presser

(57) ABSTRACT

A method of processing a mixture of heated vapors, at least two of which substantially differ in polarity from each other, the method comprising directing said mixture of heated vapors at a temperature of at least 150° C. through a hydrophobic or hydrophilic mesoporous membrane comprising a mesoporous coating of hydrophobized or hydrophilized metal oxide nanoparticles, respectively, wherein the hydrophobic mesoporous membrane permits passage of one or more hydrophobic heated vapors and blocks passage of one or more hydrophilic heated vapors, and wherein the hydrophilic mesoporous membrane permits passage of one or more hydrophilic heated vapors and blocks passage of one or more hydrophobic heated vapors. The method is
(Continued)

particularly directed to embodiments where the heated vapors emanate from a pyrolysis process. An apparatus for achieving the above-described method is also described.

29 Claims, 5 Drawing Sheets

(51) Int. Cl.
    C10B 53/02      (2006.01)
    C10G 1/02       (2006.01)
    C10G 1/00       (2006.01)
    C10K 3/00       (2006.01)
    B01D 63/06      (2006.01)

(52) U.S. Cl.
    CPC .............. C10B 53/02 (2013.01); C10G 1/002 (2013.01); C10G 1/02 (2013.01); C10K 3/00 (2013.01); B01D 2053/221 (2013.01); B01D 2255/102 (2013.01); B01D 2255/2065 (2013.01); B01D 2255/20707 (2013.01); B01D 2255/20715 (2013.01); B01D 2255/20753 (2013.01); B01D 2255/20769 (2013.01); B01D 2255/504 (2013.01); B01D 2256/24 (2013.01); B01D 2257/702 (2013.01); B01D 2257/80 (2013.01); B01D 2258/0283 (2013.01); B01D 2325/36 (2013.01); B01D 2325/38 (2013.01); Y02E 50/14 (2013.01)

(58) Field of Classification Search
    CPC ........ B01D 2325/38; B01D 2258/0283; B01D 2255/2065; B01D 2257/702; B01D 53/22; B01D 2257/80; B01D 2255/20753; B01D 2325/36; B01D 2255/20769; B01D 2255/20715; B01D 71/024; B01D 2255/102; B01D 63/063; B01D 2256/24; C10B 53/02; C10G 1/02; C10G 1/002; Y02E 50/14; C10K 3/00
    See application file for complete search history.

(56) References Cited

U.S. PATENT DOCUMENTS

| | | | | |
|---|---|---|---|---|
| 4,978,430 | A * | 12/1990 | Nakagawa ............. | B01D 53/22 |
| | | | | 159/DIG. 27 |
| 8,216,674 | B2 | 7/2012 | Simpson et al. | |
| 9,308,501 | B2 | 4/2016 | Hu et al. | |
| 9,751,047 | B2 * | 9/2017 | Lienhard ............. | B01D 61/364 |
| 9,919,275 | B2 * | 3/2018 | Qtaishat ................ | B01D 71/68 |
| 2007/0160474 | A1 * | 7/2007 | Iida .................... | B01D 67/0034 |
| | | | | 416/27 |
| 2008/0039554 | A1 * | 2/2008 | Liu .................... | B01D 67/0079 |
| | | | | 523/310 |
| 2009/0149313 | A1 * | 6/2009 | Liu ....................... | B01D 53/228 |
| | | | | 502/4 |
| 2010/0062156 | A1 * | 3/2010 | Kurth ................... | B01D 61/002 |
| | | | | 427/243 |
| 2011/0130598 | A1 * | 6/2011 | Huang .................. | B01D 3/002 |
| | | | | 568/917 |
| 2011/0311429 | A1 * | 12/2011 | Liu .................... | B01D 53/1425 |
| | | | | 423/437.1 |
| 2013/0153498 | A1 * | 6/2013 | Kiuchi ................. | B01D 61/368 |
| | | | | 210/640 |
| 2013/0213881 | A1 * | 8/2013 | Diallo ....................... | D01F 1/10 |
| | | | | 210/500.23 |
| 2014/0158610 | A1 * | 6/2014 | Qtaishat ................. | B01D 71/82 |
| | | | | 210/490 |
| 2014/0319044 | A1 * | 10/2014 | Giannelis .................. | C02F 1/44 |
| | | | | 210/321.6 |
| 2015/0053610 | A1 * | 2/2015 | Diallo ................ | B01D 67/0079 |
| | | | | 210/500.23 |
| 2015/0196874 | A1 * | 7/2015 | Temple .................. | B01D 53/78 |
| | | | | 423/210 |
| 2015/0360184 | A1 * | 12/2015 | Qtaishat ............... | B01D 61/364 |
| | | | | 210/180 |
| 2016/0045841 | A1 * | 2/2016 | Kaplan ................ | B01J 19/0093 |
| | | | | 429/49 |
| 2016/0107121 | A1 * | 4/2016 | Lienhard ................ | B01D 69/02 |
| | | | | 210/640 |
| 2016/0175771 | A1 * | 6/2016 | Guillou ................ | B01D 53/265 |
| | | | | 423/215.5 |

OTHER PUBLICATIONS

Naqvi, S.R. et al., "The Role of Zeolite Structure and Acidity in Catalytic Deoxygenation of Biomass Pyrolysis Vapors". Energy Procedia 75 ( 2015 ) 793-800.

Cheng, Y. et al., "Production of Renewable Aromatic Compounds by Catalytic Fast Pyrolysis of Lignocellulosic Biomass with Bifunctional Ga/ZSM-5 Catalysts", Angew. Chem. Int. Ed. 2012, 51, 1387-1390.

Engtrakul, C. et al., "Surface-Enhanced Separation of Water from Hydrocarbons: Potential Dewatering Membranes for the Catalytic Fast Pyrolysis of Pine Biomass", Energy Fuels 2016, 30, 8343-8348.

Hu, M. Z., et al., "Superhydrophobic and superhydrophilic surface-enhanced separation performance of porous inorganic membranes for biomass-to-biofuel conversion applications", Separation Science and Technology, Taylor & Francis, (2016), 17 pages.

* cited by examiner

INTEGRATED MEMBRANE-PYROLYSIS SYSTEMS AND METHODS

CROSS REFERENCE TO RELATED APPLICATION

The present application claims benefit of U.S. Provisional Application No. 62/286,651, filed on Jan. 25, 2016, and U.S. Provisional Application No. 62/364,477, filed on Jul. 20, 2016, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to the field of pyrolysis-catalytic processes, and more particularly, pyrolytic processes connected with petrochemical and biofuel production and usage.

BACKGROUND OF THE INVENTION

Increased use of biofuels can enhance energy and economic security, decrease life-cycle emissions of greenhouse gases and other environmental pollutants, and provide many social benefits. Biofuels impact transportation, defense, and aviation applications. Thermochemical and biochemical conversion pathways are two major routes for transforming solid biomass to liquid bio-oils, biofuels, or high-value chemical intermediates/products. Renewable liquid fuels are projected to experience the largest increase in production for meeting the United States energy consumption demands, an expected growth from 8% in 2010 to more than 14% of liquid fuels in 2035. The need for efficient separation processes is essential for moving toward a cost-competitive biofuel production process.

Significant challenges exist to integrate separation technologies into bio-oil conversion and downstream bio-refinery processes, including pretreating bio-oil. Similar cost reduction benefits may be realized for the thermochemical conversion of biomass to drop-in hydrocarbon fuels if advanced separation technologies are integrated into the intermediate processing steps within the various conversion pathways. These intermediate processing steps include fast pyrolysis, in situ or ex situ catalytic fast pyrolysis, hydropyrolysis, and hydrothermal liquefaction. Possible separation needs in the bio-oil thermochemical conversion pathway include (1) hot gas filtration and vapor-phase processing to minimize vapor cracking and light gas production, (2) solid/liquid filtration for char mitigation from liquid bio-oils, (3) fractionation of bio-oil condensates for specific catalytic transformation reactions, (4) selective separation of oxygenated/deoxygenated hydrocarbons from water or oxygenated hydrocarbons from deoxygenated hydrocarbons (either vapor- or liquid-phase) in intermediate upgraded bio-oils, and (5) selective removal of destabilizing components (e.g., organic acids) from bio-oil vapors or liquids. More efficient separation technologies in these areas would improve the overall efficiency of the biomass conversion process.

In most separation applications, the membrane performance objectives are high permeation flux, high separation selectivity, high stability (thermal, chemical, mechanical), high resistance to fouling for long-term operation, and scalability for membrane operation and material fabrication. A major challenge for integrating membranes into bio-oil or biofuel processing pathways is ensuring that the membranes maintain both high flux and high selectivity during long-term separations. Traditional membranes suffer from a permeability-selectivity "trade-off", i.e., the increase in the selectivity comes at the cost of reduced flux, and vice-versa. This issue is apparent in zeolite-based membranes, which have a high selectivity, but are limited in permeation flux due to their small sub-nanometer pores.

Moreover, conventional membranes are generally incapable of withstanding the relatively high temperature range of 300-600° C. and high water vapor concentration of pyrolysis bio-oil processing operations. Polymer membranes will generally degrade at such high temperatures. Although some zeolite-based membranes can be more robust at such temperatures, they are known to suffer from low permeation flux and also from hydrothermal instability at elevated temperatures, particularly when a high water vapor concentration (e.g., ~20-25 wt %) is present in the pyrolysis bio-oil vapor mixture. Thus, although integration of a robust vapor-separating membrane having both high flux and high selectivity into a pyrolytic system would provide significant advantages, no viable way for achieving this is currently known.

SUMMARY OF THE INVENTION

The instant disclosure is foremost directed to a method of processing a mixture of heated vapors, such as produced by a pyrolytic process. In the method, at least one robust vapor-selective hydrophobic or hydrophilic mesoporous membrane (i.e., "mesoporous membrane" or "HiPAS membrane") is integrated in order to separate the heated vapors, which may be vapors of combustion produced during a pyrolytic process. The hydrophobic or hydrophilic mesoporous membrane contains a mesoporous coating of hydrophobized or hydrophilized metal oxide nanoparticles, respectively. When a hydrophobic mesoporous membrane is used, it permits passage of one or more hydrophobic heated vapors or gaseous products and blocks passage of one or more hydrophilic heated vapors or gaseous products. When a hydrophilic mesoporous membrane is used, it permits passage of one or more hydrophilic heated vapors or gaseous products and blocks passage of one or more hydrophobic heated vapors or gaseous products. The above-described membrane is not only capable of withstanding the high temperatures and water vapor conditions typically present in a range of pyrolytic processes, but the mesoporous membrane can also advantageously provide a high level of selectivity along with a high flux, by virtue of the larger pore size (i.e., mesopores of 2-50 nm as opposed to the micropores of less than 1 nm or 2 nm, of the art) along with the chemically functionalized pore surfaces that render the membrane hydrophobic or hydrophilic. Significantly, in contrast to the traditional size-exclusion membranes of the art, which generally can make an improvement in selectivity but only at the expense of flux, and vice-versa, the above-described mesoporous membrane operates by surface-enhanced adsorption and capillary condensation effects, which circumvents this inverse relationship.

In more specific embodiments, the method includes the steps of thermally decomposing (pyrolyzing) organic material (e.g., a petrochemical fuel, or biomass, or a biofuel derived from biomass) into a mixture of heated gaseous products, at least two of which substantially differ in polarity from each other, and directing the mixture of heated gaseous products at a temperature of at least 150° C. through a hydrophobic or hydrophilic mesoporous membrane (specifically, a high-performance architectured surface selective membrane, i.e., "HiPAS" membrane) having a mesoporous coating of hydrophobized or hydrophilized metal oxide nanoparticles respectively. If a hydrophobic mesoporous membrane is selected, the hydrophobic mesoporous membrane permits passage of one or more hydrophobic gaseous products and blocks passage of one or more hydrophilic gaseous products. If a hydrophilic mesoporous membrane is selected, the hydrophilic mesoporous membrane permits passage of one or more hydrophilic gaseous products and blocks passage of one or more hydrophobic gaseous products. In particular embodiments, the pyrolysis process is a biomass pyrolysis process, or more particularly, a biofuel production process, particularly a biofuel production process that includes a biomass pyrolysis step followed by an upgrading step followed by a fractionation step, and more particularly, wherein the pyrolysis step or upgrading step includes water as a combustion byproduct. The mesoporous membrane can be integrated, for example, in the biofuel production process by being located between the pyrolysis and upgrading steps and/or between the upgrading and fractionation steps.

In particular embodiments, the HiPAS mesoporous membrane functions to separate water vapor from other less polar gaseous products produced in the pyrolytic process. A hydrophilic mesoporous membrane can separate water from the gaseous mixture by permitting passage of water vapor and blocking passage of one or more hydrophobic gaseous products. A hydrophobic mesoporous membrane can separate water from the gaseous mixture by permitting passage of one or more hydrophobic gaseous products and blocking passage of water vapor.

The HiPAS mesoporous membrane is advantageously particularly compatible with the processing of hot bio-oil vapor/gas mixtures. By integrating the mesoporous membrane in the upgrading/fractionation workings of a biofuel pyrolytic process, the resulting membrane-pyrolysis-catalytic upgrading system can produce high-quality upgraded bio-oil vapors, with significantly diminished water content, and also solves the major issues of low flux and poor hydrothermal or thermal stability associated with conventional membranes.

The present invention is also directed to an apparatus capable of achieving the vapor processing method described above. In specific embodiments, the apparatus includes a vapor production chamber that contains a heating element and is integrally connected with the hydrophobic or hydrophilic mesoporous membrane described above. In further embodiments, the vapor production chamber is a pyrolysis chamber. In yet further embodiments, the pyrolysis chamber is a combustion chamber, such as a waste processing (e.g., incineration) chamber or fuel-burning engine.

The present invention discloses the demonstrated process-intensification concept of integrating a unique high-flux tunable membrane separation (of hot pyrolysis vapors/gases mixtures) with a catalytic upgrading process to result in a new membrane-catalytic upgrading/fractionation system. The integrated system thus includes an in situ membrane dewatering technology with improved hydrothermal stability and that reduces coke formation on catalysts, which prolongs the catalyst life. There are multiple possible entry points to integrate membrane separations into bio-oil processing: before or after the pyrolysis reactor and/or upgrading reactor. The dewatering of upgraded bio-oil eliminates the need for downstream separation and reduces the cost of producing high-quality upgraded bio-oils. Moreover, when the mesoporous membrane is integrated with the upgrading/fractionation processes, the traditional energy intensive distillation-based refinery may advantageously be eliminated. The HiPAS mesoporous membranes in the integrated system are mechanically rugged, and chemically/thermally stable, i.e., they can tolerate the high-temperature condition required for hot bio-oil vapor processing. The economic benefits are significant, and include, for example, lower cost biofuel processing that will reduce carbon emissions and further petro-oil independence.

The mesoporous membranes considered herein meet several criteria, such as tunable selectivity, high permeation flux for the target molecule, and chemical and thermal stability sufficient for processing of hot pyrolysis or upgraded bio-oil vapors (50-600° C. range). The mesopores and surface functionalization in the membrane work synergistically to provide a high flux while retaining or surpassing the micropore-equivalent selectivity typically provided by conventional membranes. The integrated technology can advantageously remove over 90% of the water from pyrolysis or upgraded bio-oil vapors (from ~50 mol % down to ~3 mol %). Such an improved process will advance the commercial viability of biomass and/or biofuels. In the emerging bio-energy industry, the mesoporous membrane could be integrated either before or after the pyrolysis/upgrading reactors, enabling higher process efficiency and fractionation product quality.

Particularly when membrane separation is used prior to a catalytic upgrading reactor, it will beneficially impact downstream processing, including catalyst life/yield/cost and reactor capital. For example, removal of water vapor prior to catalytic upgrading will improve the hydrothermal stability of the ZMS-5 type zeolite catalyst and result in less carbon coking on the catalyst surfaces, which results in longer lifetime and better yield.

This invention discloses an innovative integration of unique super-hydro-tunable or super-organo-tunable mesoporous HiPAS membranes with biofuel processing at elevated temperatures (250-600° C.) and high water vapor contents, which are typical conditions in pyrolysis and bio-oil vapor upgrading reactors, to provide a new processing capability to reduce process cost, prolong the lifetime of the catalyst used for upgrading, and to achieve membrane fractionation. The integrated membrane-pyrolysis-catalytic processing systems will have a significant impact on bio-refinery industries involved in biomass pyrolysis bio-oil vapor separations, upgrading, and fractionation to produce various hydrocarbon biofuels. Specifically, as further discussed below, the integrated HiPAS membrane-catalytic upgrading system can produce high quality upgraded bio-oil vapors containing little water content (less than ~3 mol %), which is an impressive result compared to traditional upgraded vapor, which generally contains ~50 mol % water vapor. The high-flux membrane separation (and dewatering) capability of these mesoporous membranes will provide a pyrolysis/upgrading reactor system that produces higher-quality bio-oil products at lower cost.

DETAILED DESCRIPTION OF THE INVENTION

Figure 1:
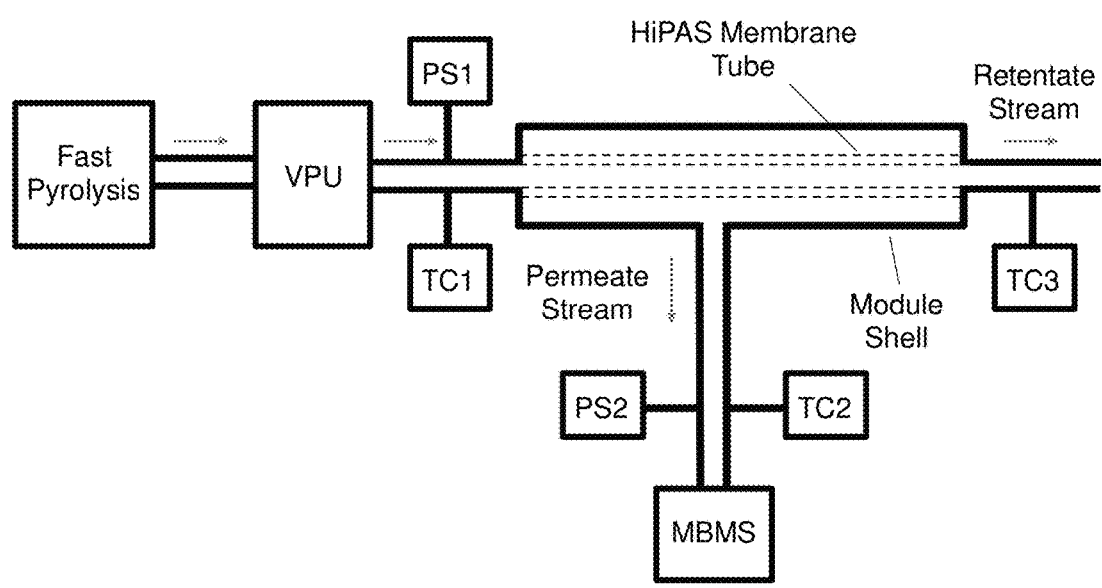
FIG. 1. General representation of the set up used for testing vapor phase selectivity.

The hydrophobic or hydrophilic mesoporous (HiPAS) membrane is described, for example, in U.S. Pat. No. 9,308,501 and M. Hu et al., *Separation Science and Technology*, Nov. 4, 2016, pp. 1520-1574, DOI: 10.1080/01496395.2016.1260144, the disclosures of which are herein incorporated in their entirety. The HiPAS membrane (also referred to herein as the "mesoporous membrane") includes, at minimum, an outer mesoporous coating (i.e., layer or film) of hydrophobized or hydrophilized metal oxide nanoparticles. The mesoporous coating of hydrophobized or hydrophilized metal oxide nanoparticles is also herein referred to as a "surface selectivity layer" or the "S-layer". The S-layer is "outer" in the sense that is not covered by another layer of another material. This makes the S-layer positioned as a first area of contact with the hot gaseous mixture. The S-layer functions to enhance selectivity by engaging in strong affinity interactions with molecules of similar polarity. The metal oxide nanoparticles in the S-layer can be, for example, silica or alumina aerogel particles that have been chemically modified with hydrophobic or hydrophobic functional groups, such as by reaction with reactive silane molecules having hydrophilic or hydrophobic functional groups. The S-layer possesses mesopores, which are pores of 2 to 50 nm in size. In different embodiments, the S-layer may possess mesopores of, for example, 2, 5, 10, 15, 20, 25, 30, 35, 40, 45, or 50 nm in size, or mesopores within a size range bounded by any two of the foregoing values. The S-layer generally does not include micropores, which generally have a size less than 1 or 2 nm in size. The S-layer may or may not contain macropores, which generally have a size above 50 nm, or at least or above 60, 70, 80, 90, or 100 nm in size. In some embodiments, macropores of any of the foregoing sizes may be excluded. Generally, the S-layer has a thickness of at least 1, 2, or 3 microns and up to 4, 5, 6, 7, 8, 9, or 10 microns.

In the HiPAS membrane, the S-layer is generally disposed on a durable porous support, with pores in the support generally at least 1 micron. The porous support can be constructed of any of the refractory materials known in the art that can withstand high temperatures and high water vapor conditions without loss of integrity. The support can be, for example, a high temperature ceramic or corrosion-resistant metal or metal alloy, such as a steel. In some embodiments, the support is in the shape of a tube with porous walls in order to permit entry of a hot gaseous feed stream and transport and release of select gaseous molecules through the S-layer and through the pores of the support.

In some embodiments, the HiPAS membrane further includes an intermediate porous layer (herein referred to as an "A-layer") disposed between the S-layer and porous support. Generally, the A-layer possesses smaller pores than the S-layer, typically micropores, which function primarily by size exclusion. Inclusion of an A-layer can enhance the selectivity, particularly if the pore size in the S-layer is larger than ideal. The A-layer can be independently constructed of metal oxide particles, or other robust material, such as polymer-ligand functionalized etched glass, diatomaceous earth-polymer hybrid materials, and polymer-ligand functionalized inorganic nanotubes. The thickness of the A-layer can be approximately the same as for the S-layer.

The heated vapors may emanate from or be a result of any process that produces a mixture of heated vapors and where separation of vapors based on polarity differences could be beneficial. In some embodiments, the process is non-pyrolytic, such as a thermally-induced evaporative process. In other embodiments, the process is a pyrolytic process. In either case, the HiPAS membrane is integrated with the process that produces the heated vapors such that the heated vapors make contact with and are processed by the HiPAS membrane.

In the case of a pyrolytic process, the pyrolytic process in which the HiPAS membrane is integrated can be any of the pyrolytic processes known in the art. The term "pyrolysis," as used herein, and as generally accepted, refers to the thermal decomposition of a substance. However, for the instant purposes, only those pyrolysis processes producing a mixture of gaseous substances are considered. The substance undergoing pyrolysis is generally an organic material (i.e., contains carbon, or alternatively, one or more carbon-hydrogen bonds), although the pyrolysis of inorganic materials (e.g., sodium bicarbonate) is considered herein. Some examples of organic materials that may be pyrolyzed include hydrocarbons and non-hydrocarbon combustible organic substances, such as alcohols, ethers, biomass, and biofuels, such as biodiesel or bio-oil, the latter of which generally includes mixtures of many functionalized organic compounds, such as long-chain fatty esters. The pyrolysis process may be, for example, a hydrocarbon combustion process. Where the hydrocarbon is a petrochemical fuel (e.g., gasoline, diesel, natural gas, or propane), the hydrocarbon combustion process is more particularly a petrochemical combustion process. In some embodiments, the petrochemical combustion process is one that occurs in a fuel-powered engine, which may be, for example, an automobile or industrial engine. In such a case, the HiPAS membrane can process the exhaust stream from the engine. The pyrolytic process may alternatively be, for example, a biomass pyrolysis process, biofuel production process (e.g., biodiesel or bio-oil production process), waste incineration process, or industrial process for the production of a commodity chemical. The temperature employed in the pyrolysis process is generally at least 150° C., and in other embodiments may be at least or above, for example, 200° C., 250° C., 300° C., 350° C., 400° C., 450° C., 500° C., 550° C., 600° C., 650° C., or 700° C., or a temperature within a range bounded by any two of these temperatures. Generally, the mixture of heated gases generated by the pyrolytic process will contact the HiPAS membrane at one of the above elevated temperatures.

In one set of embodiments, the HiPAS membrane is integrated into a biomass or bio-oil pyrolysis process. As well known, biomass can be pyrolyzed to produce any of a variety of biofuels that share a similar chemical profile with a petrochemical blendstock, e.g., gasoline, diesel, or jet fuel. The biomass can be any of the biomass materials known in the art. As used herein, the term "biomass" is generally defined as any natural-derived material having a cellulosic or lignocellulosic component, as commonly found in wood and other lignocellulosic plant materials. The biomass material can be, for example, wood (e.g., hardwood and softwood), a grass or mixture thereof (e.g., perennial grass or cereal grass), sugarcane (e.g., sugarcane bagasse), paper, cardboard, hull material (e.g., grain hulls or nut hulls, such as corn stover), or a vegetable or algal oil. In some processes, biomass is initially converted, via a fast pyrolysis, to a bio-oil (or "pyrolysis oil") fraction. As well known, most pyrolysis processes include an upgrading step that refines and chemically modifies the initial crude pyrolysis product to produce a biofuel with a higher quality composition. Typically, after pyrolysis and upgrading steps, the upgraded biofuel stock is fractionated and refined to form the various fuel grades. The HiPAS membrane is integrated in the biofuel production process by being located in any useful location of the process, e.g., between the pyrolysis and upgrading steps and/or between the upgrading and fractionation steps.

The HiPAS functions to separate heated gaseous compounds that substantially differ in polarity from each other. For example, the gaseous mixture may include at least one non-polar gaseous compound, such as a hydrocarbon, such as a $C_{1-20}$ alkane or alkene or aromatic compound (e.g., benzene, toluene, or xylene), and the gaseous mixture may also include at least one compound of greater polarity, such as water, an alcohol (e.g., methanol, ethanol, 1-propanol, 2-propanol, or 1-butanol), phenol, an ether, ester, or ketone. By one embodiment, the HiPAS membrane is hydrophobic and permits passage of one or more hydrophobic gaseous products and blocks passage of one or more hydrophilic gaseous products. By another embodiment, the HiPAS membrane is hydrophilic and permits passage of one or more hydrophilic gaseous products and blocks passage of one or more hydrophobic gaseous products.

In some embodiments, the mixture of heated gaseous products includes water vapor, generally as a byproduct of pyrolysis (combustion) or as a component of the biomass. By integration of the HiPAS membrane in the pyrolysis process, water vapor is separated from other less polar gaseous products. By one embodiment, the HiPAS membrane is hydrophobic and permits passage of one or more hydrophobic gaseous products and blocks passage of water vapor. By another embodiment, the HiPAS membrane is hydrophilic and permits passage of water vapor and blocks passage of one or more hydrophobic gaseous products. By integration of the HiPAS membrane in the pyrolysis process, at least 80%, 85%, 90%, 92%, 95%, or even 97% of the water in the mixture of heated gaseous products is separated from other less polar gaseous products. As indicated above, the mixture of heated gaseous products may, in some embodiments, emanate from an exhaust stream of an engine that uses a petrochemical fuel or biofuel.

The HiPAS mesoporous membrane described above may also include a metal-containing coating that functions as a catalyst (i.e., a metal catalyst layer). In some embodiments, the metal-containing coating is constructed of metal-containing nanoparticles. The metal-containing catalyst may be composed of one or more zerovalent metals, metal oxides, metal sulfides, metal nitrides, or metal carbides. The metal-containing catalyst may function, for example, as a deoxygenation, partial deoxygenation, hydrogenation, hydrodeoxygenation, hydrodesulfurization, hydrodenitrogenation, or steam reforming catalyst. Some examples of metal-containing catalysts include platinum, palladium, nickel, rhodium, ruthenium, molybdenum, titanium, zirconium, and cerium, and their oxide, sulfide, nitride, and carbide compositions. A catalytic zeolite (e.g., Ga-zeolite), in which the zeolite is ZSM-5 or other type of zeolite, may also be incorporated. Methods for incorporating such metal-containing compositions into a porous material are well known in the art. The metal-containing composition may be incorporated in the HiPAS membrane by, for example, any of the dry or wet impregnation methods well known in the art.

In another aspect, the application is directed to an apparatus capable of achieving the vapor separation process described above. The apparatus comprises, at minimum, a vapor production chamber that contains a heating element and is integrally connected with the hydrophobic or hydrophilic mesoporous membrane described above. The chamber can be constructed of any of the thermally resilient materials known in the art, such as a steel or high temperature ceramic. The chamber can be, for example, a pyrolysis chamber, or more specifically, a fuel-burning (fuel-combusting) engine. The heating element can be any of the heating elements known in the art, and which should be capable of either combusting (pyrolyzing) material placed in the chamber or inducing an accelerated evaporation of a liquid. By being "integrally connected," the vapor production chamber is connected by a suitable conduit or series of conduits (e.g., piping) to the mesoporous membrane such that the mixture of heated vapors can make contact with and become processed by the mesoporous membrane. In some embodiments, the apparatus includes one or more outlets that release one or more vapors from the vapor production chamber, wherein the vapors being released may have been blocked by or have passed through the mesoporous membrane. The one or more outgoing vapors may be discharged to the atmosphere or into a separate chamber or other facility for further processing. The apparatus may or may not also include a vaccuum or fan element, e.g., placed downstream of the mesoporous membrane, in order to facilitate the movement of gases to the membrane.

Examples have been set forth below for the purpose of illustration and to describe certain specific embodiments of the invention. However, the scope of this invention is not to be in any way limited by the examples set forth herein.

EXAMPLES

Preparation of HiPAS Membranes

The porous tubular supports were 9 inches long and made of Type 434 stainless steel (SS) with an average pore size of ~4.3 µm. The tubular structure has an ~11.3 mm outer diameter (OD) with a wall thickness of ~0.55 mm. Non-porous 0.5 inch diameter end fittings were welded onto the porous tubes at the cross-section using an orbital welding technique, so that they could be sealed into test systems using standard compression fittings, such as those made by Swagelok®. For the vapor-phase separation membranes, a mesoporous alumina A-layer was coated on the inner wall of the SS434 tube and the pore size was adjusted by controlling the sintering temperature of the layer. The textured S-layers were prepared by depositing silica aerogel particles on the mesoporous alumina layer. This coated and textured inner wall surface was functionalized with either a hydrophilic or hydrophobic silane ligand precursor using a liquid solution treatment process, as further described in U.S. Pat. No. 8,216,674. Additional details on the fabrication of the HiPAS membranes can be found in U.S. Pat. No. 9,308,501.

The intermediate A-layer provides the controlled pore size for the membrane. For the vapor phase studies, an ~5 µm thick nanoporous (specifically, mesoporous of ~8 nm pores) gamma-alumina coating having approximately 30% porosity was applied to the inner wall of the porous SS434 tube. The alumina layer was heat-treated between 600° C. and 960° C. to adjust the pore size and to create a stable mesoporous network by forming necks between the particles. The flow-weighted pore size distributions of the alumina layers were determined by first filling the pores of the membrane with a condensable fluid and then measuring the gas flux as the pores are emptied from the largest to the smallest diameter (Fain, D. E. (1990), *Proc. 1st Intl. Conf. Inorganic Membranes*, 1-5 Jul. 1989, 199-205, Montpellier). The median pore diameters of the membranes investigated in this study were ~4 nm and ~8 nm (for vapor phase separations), and ~4 µm (for liquid phase separations). Each membrane was bubble tested with isopropanol to verify that it was leak-free before use. While the initial efforts in this paper concentrated on controlling the pore size uniformity of the alumina layer by varying the time and temperature of the heat treatment process, the pore architecture in the A-layer may be further developed by engineered control of the pore shape, ordering, and orientation.

The initial vapor phase membrane selectivity studies were conducted using a test reactor having the general design depicted in FIG. 1. The reactor included a horizontal quartz reactor connected to a custom-built stainless steel membrane holder housing a tubular membrane with standard Swagelok fittings and graphite ferrules, as further described in C. Mukarakate et al., *Green Chemistry*, 16:1444, 2014. Although not shown, the permeate line is connected to the faceplate for the molecular beam mass spectrometer (MBMS).

There has been a significant amount of research on the development of superhydrophobic surfaces utilizing surface texturing and chemical functionalization processes. In principle, superhydrophobicity is due to surface ligand chemistry and can be amplified by the surface texture that can increase the contact angle of a water droplet to well above 150°, and in some cases, approaching 180°. For traditional "coating" applications, the textured deposits layer does not have to be "permeable" to vapor, gas, or liquid. However, for membrane applications, the textured layer must be permeable and the underlying substrate pore size must be controlled. The requirement of the permeable textured layer increases the difficulty in making HiPAS membranes because a significant portion of the superhydrophobic coating research to date has been for non-permeable coatings on solid substrates.

Tuning the surface properties of the inorganic membrane surface layers from superhydrophobic to superhydrophilic can enhance selectivity for perm-extraction of a particular molecular species without the need to reduce the membrane pore size to dimensions <1 nm, distinguishing this HiPAS approach from the current state-of-the-art high selectivity polymer membranes, e.g., perfluoropolymer-based membranes. The multi-layer hierarchical pore design in HiPAS membranes also minimizes the loss of selectivity typically associated with defects or cracks, which is observed frequently in zeolite-based membranes.

In this work, a top textured superhydrophilic or superhydrophobic layer (S-layer) comprised of either silica aerogel particles or mesoporous alumina coating was deposited onto the inner wall of a bare macroporous SS434 support tube to create surface roughness/texture. For superhydrophobic HiPAS membranes, the surface selective S-layers were treated with a chemical solution of a perfluoro-terminated alkyl silane precursor (1H,1H,2H, 2H-perfluorodecyltrimethoxysilane, PDTMS). Notably, the molecular ligands also modify the surface chemistry of pores in the A-layer and support. The contact angles for the superhydrophobic surfaces of coated supports typically ranged from 165 to 179°. For the superhydrophilic membranes, hydroxyl-terminated molecular ligands (Hydrophil-S solution) were employed to modify the alumina coating surface (~0° contact angle). The effectiveness of the modified superhydrophilic surface was confirmed by the improved wetting (>10 times faster spreading) and higher penetration rate of water droplets into the membrane surface. The water penetration time into the modified superhydrophilic surface (<5 seconds) was observed to be much shorter than for the unmodified surfaces of the SS434 inner wall or alumina coating, which typically did not allow water droplets to penetrate into the membrane surface completely.

Evaluation of HiPAS Membranes

The feed was introduced into the inside of the tube and the permeate stream was collected on the shell side of the tube. The permeate line of the membrane assembly was connected to the molecular beam mass spectrometer (MBMS) to monitor changes in the permeate concentration. Vapor phase feed mixtures consisted of (1) toluene-water and (2) toluene-phenol-water. The water and organic compounds were introduced into the horizontal quartz reactor via two separate syringe pumps and vaporized using a five-zone furnace. The toluene-water and toluene-phenol-water vapor mixtures were generated in the horizontal quartz reactor housed in a furnace at 500° C. For the toluene-water vapor mixtures, toluene was injected into the outer tube of the quartz reactor at a constant flow rate (3 µL/min) and the vapors were transported through the outer tube by sweeping with helium at 1.0 slm. Water was injected into the inner tube of the quartz reactor and the flow rate was increased from 0 to 125 µL/min during the evaluation of the membrane selectivity. The vaporized water was transported through the inner tube by helium at 0.4 slm. The temperatures of the feed-side (TC1) and permeate-side (TC2) vapors and gases were controlled at 250° C. while the membrane assembly was not heated. The temperatures of the reject-side (TC3) vapors and gases and the maximum outside surface of the membrane holder were 143° C. and 36° C., respectively.

The change in pressure across the membrane was monitored using pressure sensors. The feed-side (PS1) and permeate-side (PS2) pressures were 0 and −315 inches of water, respectively. The setup for the toluene-phenol-water membrane selectivity test was similar to the toluene-water tests. A liquid toluene-phenol mixture (1:1 mol %) was injected into the outer tube of the quartz reactor at a constant flow rate (3 µL/min) and the vapors were swept through the outer tube by helium at 1.4 slm. Water was injected into the inner tube of the quartz reactor and the flow rate was increased from 0 to 780 µL/min during the toluene-phenol-water tests. The vaporized water was transported through the inner tube by helium at 0.4 slm. The temperature of the feed-side vapor in the toluene-phenol-water experiments was controlled at 250° C. The membrane assembly was not heated and continuously cooled using a fan. The temperatures of the reject-side vapors and the initial temperature of the outside surface of the membrane holder were 156° C. and 50° C., respectively. The feed-side and permeate-side pressures were 0 and −195 inches of water, respectively.

The MBMS has been used previously for real-time sampling of products of the pyrolysis and upgrading of biomass, e.g., C. Mukarakate, et al., (2014), *Green Chemistry*, 16: 4891. Briefly, the permeate line of the membrane assembly was directly connected to the faceplate of the MBMS (FIG. 1). The faceplate was heated to 325° C. to prevent cooling of the vapors and gases before adiabatic expansion. The vapors and gases undergo adiabatic cooling through an orifice (250 μm) into a vacuum chamber at ~100 mtorr. The cooled gas was skimmed into a molecular beam and ionized using an electron impact ionization source (22.5 eV). The positive ions produced were measured using a quadrupole mass spectrometer. A mass spectrum was collected every second with a m/z range of 10-500. A small amount of argon was used as a tracer gas (30 sccm) and introduced in the helium carrier gas stream.

Vapor Phase Toluene-Water Membrane Selectivity with ~4 nm Pore HiPAS Membranes

As discussed above, the thermochemical conversion of biomass involves high-temperature vapor phase reactions (~350-500° C.). Effective vapor phase separations could provide multiple benefits to the overall efficiency of the process, such as enhanced carbon recovery, prolonged catalyst life, or the improved quality of intermediate upgraded bio-oils. The ultimate goal is to integrate the membrane separations into the bio-oil thermochemical vapor phase process. Water and toluene are two representative vapor phase components typically observed when zeolite catalyst technology is applied to the upgrading of pyrolysis vapors to aromatic hydrocarbons.

Figure 2:
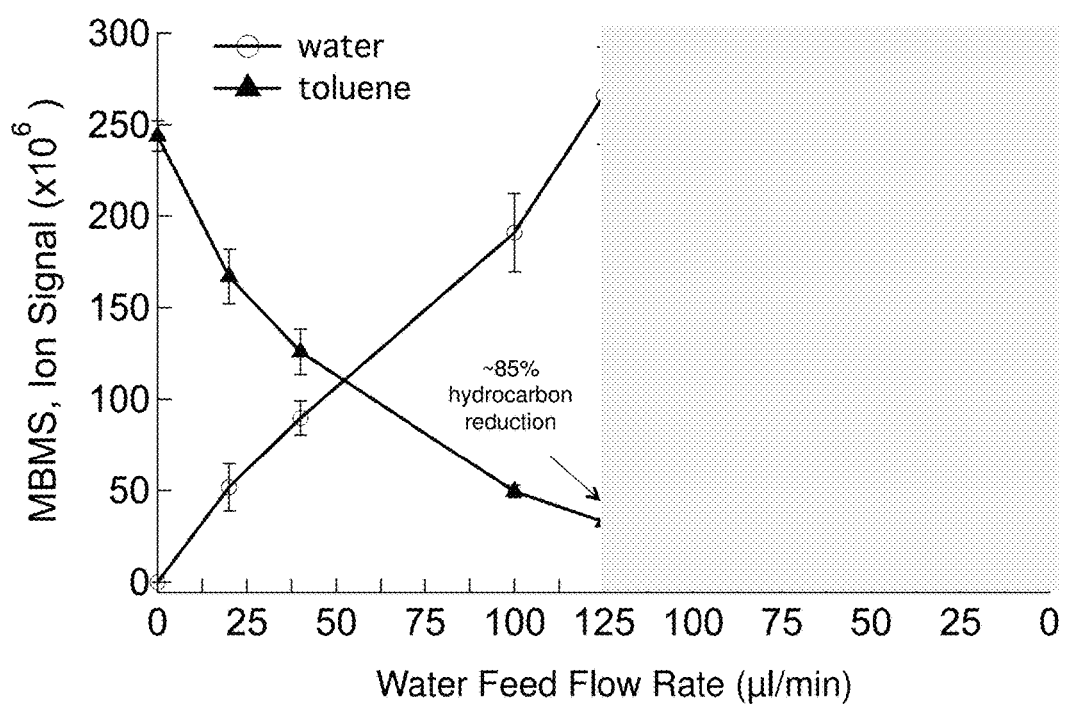
FIG. 2. Graphical plot of vapor phase toluene-water membrane selectivity data with a superhydrophilic HiPAS membrane (~4 nm pores, membrane #1). The ion signals for water and toluene in the permeate stream were monitored via MBMS. Toluene vapor was introduced into the feed at a constant rate while the flow rate of water vapor was changed accordingly.

FIG. 2 is a graph showing the toluene-water mixed vapor separation performance data using a superhydrophilic membrane (~4 nm pore size). Toluene-water vapor mixtures were prepared by simultaneously injecting water and toluene into an inert carrier gas (helium) stream flowing through a horizontal quartz flow tube reactor heated to 500° C. The injection rate of toluene was held constant while the rate for water was varied from 0 to 125 μL/min (shown as the x-axis in FIG. 2).

When vaporized, the gas stream contained approximately 0.04% toluene vapor by volume or moles and the water vapor concentration varied from 0 to 9.8% by volume or moles. The temperature of the vapor mixture downstream of the horizontal quartz flow tube reactor was maintained at 250° C. to ensure that the vapors did not condense in the gas lines. The vapor mixture was then fed into the tubular membrane, which was not heated. The outside surface of the membrane holder was monitored using a thermocouple and the temperature remained at 36° C. during this test. The transport of water and toluene vapors through the membrane (permeate side) was analyzed via the in-line MBMS. Because the MBMS system operates under a vacuum, the permeate stream was held at a pressure of approximately −315 inches of water (or approximately 23 kPa absolute pressure). The MBMS monitored the real-time permeate stream composition collected on the outside of the tube (the shell side of membrane). As the water injection increased from 0 to 125 μL/min, the MBMS signal for water in the permeate stream increased as expected. The MBMS signal correlated linearly with injection rate with an R² of 0.997. But, the concentration of toluene in permeate stream, as indicated by a decrease in the corresponding MBMS signal, decreased significantly (~85% reduction in the toluene signal intensity, FIG. 2), leading to a high water/toluene selectivity for the membrane. When the water was turned off, the toluene signal returned to the original value and the water signal returned to zero. These data show that the water vapor inhibits the flow of toluene through the pores. The experimental Separation Factor for water over toluene was calculated using Eq. (1) below.

$$\text{Separation Factor} = \frac{\frac{C_{Water\ Permeate}}{C_{Toluene\ Permeate}}}{\frac{C_{Water\ Feed}}{C_{Toluene\ Feed}}} \quad (1)$$

$$= \frac{(R_I)_{Permeate}}{(R_I)_{Feed}}$$

In the above formula, $C_{Water\ Permeate}$ is the water vapor concentration on the permeate side and $(R_I)_{Permeate}$ is the ratio of the ion signals for water over toluene on the permeate side. For a membrane, the mechanisms for gas (or vapor) selectivity can be due to many factors including Knudsen diffusion, size exclusion, surface diffusion, adsorption, and capillary condensation. Of these, Knudsen diffusion and size exclusion are the two most commonly observed mechanisms for separation of gases. Size exclusion, sometimes referred to as "molecular sieving," requires membrane pores that are on the order of molecular dimensions, so that one molecule fits in the pores and transports through while the other molecule is too large to fit in the pores. Since the pores in these membranes are on the order of 4-8 nm and most gas molecules including water and ethanol are smaller than 0.5 nm, size exclusion is an unlikely separation mechanism for this separation. Knudsen diffusion employs the relative kinetic velocity of the gases for separation by a typical mesoporous membrane (long narrow pores of 2-50 nm diameter). When the gas density is low, the mean free path between molecules much greater than the pore size and Knudsen diffusion can be assumed as the gas molecules collide elastically (no surface interaction) with the pore walls more frequently than with each other. The theoretical perm-selectivity for Knudsen diffusion is the inverse ratio of the square root of the molecular weights, as expressed by the following equation.

$$S_{Water/Toluene} = \sqrt{\frac{MW_{Toluene}}{MW_{Water}}} = 2.26$$

When the water injection rate was 125 μL/min (or when the water concentration was 9.8%), the concentration of toluene (measured by the MBMS technique) decreased by a factor of 7.4 compared to the test with no additional water injected which translates to a calculated separation factor of approximately 13. A higher separation factor translates to higher membrane selectivity. Because only one stream at a time could be monitored with the MBMS, the feed concentration of toluene and water was determined using a nonporous surrogate tube. If Knudsen diffusion were the primary separation mechanism, the theoretical separation factor per Eq. (2) ($S_{Water/Toluene}$) would be approximately 2.26. Since the experimental separation factor (13) was much higher than 2.26, an additional non-Knudsen diffusion mechanism is likely controlling the separation under these conditions. In addition, the observation that the flux of each species is affected by the water feed flow rate is another indication that the mechanism is not Knudsen. One of the key assumptions of Knudsen flow is no molecule-molecule interactions, only molecule-surface interaction.

Thus, there remains the question on what is the contributing mechanism for higher separation selectivity other than Knudsen diffusion. As in size exclusion, surface diffusion or flow is improved with decreasing pore size. High temperature can also decrease the adsorption and surface diffusion (e.g., Tang, J.; Sirkar, K. K. (2012), *Journal of Membrane Science*, 421-422: 211). Because of the relatively large pore size and high gas feed temperature, surface diffusion is not expected to be a major transport mechanism for the data shown in FIG. 2. However, surface diffusion cannot be ruled out as a contributing factor to the transport mechanism.

Figure 3:
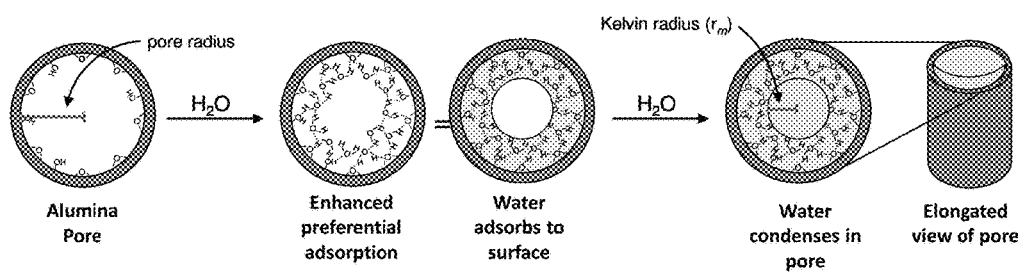
FIG. 3. Schematic illustration depicting a surface-enhanced capillary condensation mechanism that is believed responsible for improving the HiPAS membrane selectivity in the vapor phase.

However, capillary condensation, as illustrated in FIG. 3, can occur in larger pores and separate gas mixtures by condensing one gas in the capillary pores and blocking the flow of the other gas. If the pores are completely filled and the second gas is not soluble in the condensed liquid, an infinite selectivity can be achieved. Capillary condensation seems to be very plausible considering the experimental conditions and can be described by the Kelvin Eq. (3), as follows (Gregg, S. J.; Sing, K. S. W. (1982) Adsorption, Surface Area and Porosity, 2nd Ed.; Academic Press: London)

$$\ln\left(\frac{P}{P_{sat}}\right) = \frac{-2\gamma V_m}{r_m RT} \quad (3)$$

In the above equation, $P/P_{sat}$ is the ratio of the vapor pressure to the saturation vapor pressure, $\gamma$ is the surface tension of the fluid, $V_m$ is the molar volume, $r_m$ is the radius of the cylinder pore to fill, R is the gas constant, and T is the temperature of the pore or membrane. The radius, $r_m$, is often referred to as the Kelvin radius and is not the radius of the pore. But, it is the radius of the open pore cylinder. In other words, the Kelvin radius is the radius of the pore minus the thickness of the adsorbed layer of vapor. The Kelvin equation demonstrates that the equilibrium vapor pressure above the meniscus of the pore is lowered as the Kelvin radius is decreased. This lower vapor pressure is essentially the minimum amount of vapor needed to achieve capillary condensation for a given pore size.

As discussed above, it was observed that the incremental presence of water vapor improved the membrane performance by decreasing or inhibiting the hydrocarbon (toluene) vapor permeability. This phenomenon could be very well interpreted as the result of capillary condensation in the surface-modified pores of the HiPAS membrane. If water were to condense in the pores and block the flow of toluene vapor, one would expect the permeance of toluene to decrease in the presence of enough water to promote capillary condensation. Since the surfaces of the pores of the tested membrane are superhydrophilic, it would be expected that the polar water molecules would be more likely to adsorb on the surface of the pores than the non-polar toluene molecules. Also, the water vapor concentration was much higher (ranging from 1.7 to 9.8%) than the concentration of toluene (0.04%), making it more likely for water to condense in the pores than toluene.

To test the hypothesis that water may be condensing in the pores and blocking the flow of toluene, the Kelvin equation was used to estimate the minimum amount of water vapor needed to fill the pores of the 4 nm membrane. Since the equation uses the Kelvin radius $r_m$, the thickness of the adsorbed layer must be either estimated or determined. Conceptually, superhydrophilic surfaces trigger the capillary condensation at a lower equilibrium water vapor pressure (concentration) relative to a bare alumina pore wall having lower hydrophilicity. The affinity of the superhydrophilic surface for water increases the adsorption of water and thus the thickness of the adsorbed layer compared to that of a conventional hydrophilic surface (the hydrophobic surface should have little or no adsorption of water). This increased water adsorbed layer thickness decreases the Kelvin radius and thus promotes capillary condensation at a lower threshold water vapor pressure PC (or threshold concentration, $C_t$). Because of the adsorbed water (assuming a layer thickness of 0.5 nm), an estimated 3 nm Kelvin diameter or 1.5 nm radius was used for the calculation here. Also, because it is hard to measure the exact temperature of the membrane where the condensation would take place, the membrane temperature was assumed to be slightly higher than the outside surface of the holder (36° C.). Note, capillary condensation releases heat that can warm up the membrane. Calculations were performed at two temperatures, 40° C. and 60° C. At 40° C., the minimum concentration $C_t$ needed to condense water vapor in the membrane pore was calculated to be 3.8 mol %. At 60° C., almost 11% water vapor would be needed to condense in the pores.

In this experiment, the water vapor concentration in the feed varied from 1.7 to 9.8% by controlling the feed rate of water (x-axis in FIG. 2). The membranes also have a distribution of pore sizes. Therefore, as the concentration of water vapor increased, the smallest pores were filled first followed by the progressively larger pores. The data in FIG. 2 suggest that the smallest pores were filled with water at a low water flow rate and blocked some pores for the permeation of toluene. As the water flow rate was further increased, the concentration of water in the vapor phase increased and successively larger pores became filled blocking more pathways for the permeation of toluene until the toluene concentration in the permeate reduced to 15% of its original concentration at the highest water feed rate provided. FIG. 3 schematically illustrates how increasing water vapor concentration in the feed eventually leads to water condensation in the membrane pores that can block the permeation of organic molecules such as toluene vapor. Any condensed water in the membrane pores on the feed side would be transported through the membrane due to a transmembrane pressure gradient and, in this case, the water re-vaporized due to the vacuum on the permeate side (i.e., shell side), where the vaporized water was analyzed by the MBMS. The Kelvin equation predicts that higher water vapor concentrations cause larger pores to condense with water and the data support this phenomenon. Also, the Kelvin equation predicted that the concentration of water used in these tests could fill the membrane pores at a temperature consistent with the test conditions.

These results and the above analysis support capillary condensation as the most likely separation mechanism. The Kelvin equation indicates that a threshold minimum value of water vapor concentration ($C_t$) in the feed is needed to activate the membrane selectivity (i.e., inhibit hydrocarbon permeation) by initiating the condensation of water in the pores of the membrane. At 40° C., the Kelvin equation suggests that 3.8% water vapor is needed to condense in pores with a Kelvin diameter of 3 nm. In order to verify the water activation effect, as shown in FIG. 2, the feed water vapor concentration was reduced back to zero, which lowered the membrane selectivity by allowing the pores to empty and allow hydrocarbons (toluene) to permeate again through the membrane. Notably, the surface effect and pore-size based capillary condensation are synergistic phenomena for the surface-modified HiPAS membranes. A superhydrophilic surface has a high affinity for water increasing adsorption and promoting capillary condensation. But, a superhydrophobic surface would repel water and allow non-polar species to preferentially adsorb on the pore walls and condense if the conditions (i.e., minimum vapor pressure, pore size, and membrane temperature) are met. In the above test shown in FIG. 2, it was demonstrated how employing a superhydrophilic membrane can promote the preferential permeation of the more polar species (water) while rejecting the non-polar species (toluene). Just as superhydrophilic membranes promote the permeation of polar compounds such as water, superhydrophobic membranes are expected to promote the permeation of non-polar species while rejecting the more polar species.

For practical applications, it should be recognized that the feed water content in crude or processed bio-oils could be much higher, e.g., ~20% by weight (equivalent to ~50% on molar basis), than the maximum water vapor concentration utilized in the experiments here. Thus, the HiPAS membranes should be even more selective to separate water from the less polar hydrocarbons until the water vapor concentration is lowered down to the threshold value $C_t$. If HiPAS membranes could lower the water vapor concentration in the feed from ~50 mol % down to a threshold value of 3.8 mol %, for example, about 92% of the water could be removed from hydrocarbon bio-oil vapor mixtures. Based on the above results, a plug-in flow-through membrane separation module could be used for the efficient dewatering from a hydrocarbon-water mixture stream. The impact of these vapor-phase studies is that they provide a precedent for future development of highly selective HiPAS membranes, which could improve vapor phase processing operations with real pyrolysis/upgraded bio-oils. Water, which exists almost everywhere in biofuel production, is a bio-oil impurity that disrupts and blocks the reactions that lead to biofuels (Yoon, Y. H.; et al. (2014), *Journal of the American Chemical Society*, 136: 10287.) Thus, a water management or dewatering technology could be critical to the biomass-to-biofuel conversion production processes.

Vapor Phase Toluene-Phenol-Water Membrane Selectivity with Larger Pore (8 nm) HiPAS Membranes The functionality of a superhydrophilic HiPAS membrane was evaluated under simulated fast pyrolysis upgrading conditions using a simple representative three-component mixture in the vapor phase consisting of a non-oxygenated hydrocarbon, an oxygenated hydrocarbon, and water. Toluene and phenol were chosen as the non-oxygenated and oxygenated hydrocarbons, respectively. A larger pore (8 nm) superhydrophilic HiPAS membrane was initially exposed to a constant feed mixture containing a 1:1 molar mixture of phenol and toluene. The toluene-phenol solution was injected into an inert carrier gas stream flowing through a horizontal quartz flow tube reactor heated at 500° C. The concentration of water vapor in the feed stream was varied by increasing the injection rate of liquid water into the heated quartz reactor from 0 to 780 μL/min, with the results shown in FIG. 4. When vaporized, the gas stream contained approximately 0.02% toluene vapor by volume, 0.02% phenol, and the water vapor concentration varied from 0% to 40.4% by volume. The vapor mixture was fed into the tubular membrane, which was not heated.

The outside surface of the membrane holder was monitored using a thermocouple and the temperature varied with the water flow rate, as shown in Table 1 below. The temperature of the membrane holder with only the flow of the helium carrier gas and organic vapors started at 29° C. and increased as water was added to the feed stream. At the highest tested water flow rate, the membrane holder was 50° C. There are at least two phenomena that can contribute to this observation. First, the higher steam concentration increases the heat capacity of the feed stream. Since the feed was controlled at the same temperature throughout the tests, a higher heat capacity means more heat going into the membrane. Also, the capillary condensation of water vapor releases heat, which would also warm up the membrane. The higher condensation rate requires more heat to be removed through the membrane holder to ambient air (cooled by a fan). Because the larger pores require a higher concentration of water vapor for condensation and have a lower resistance to the flow of the condensed water through the membrane, a higher rate of condensation was expected. Compared to the earlier two-component test, this higher rate of condensation increased the amount of heat released through the capillary condensation process.

TABLE 1

Temperature of membrane holder as a function of the water flow rate in the toluene-phenol-water vapor test.

| Water Injection Rate (μL/min) | Membrane Holder Temperature (° C.) |
|---|---|
| 0 | 29 |
| 80 | 30 |
| 380 | 43 |
| 580 | 48 |
| 780 | 50 |
| 0 | 33 |

The transport of water, phenol, and toluene vapors through the membrane (permeate side) was analyzed via the in-line MBMS. The permeate stream was held at a pressure of approximately −195 inches of water (or approximately 52.9 kPa absolute pressure). The conditions were similar to those used in the above two-component mixture case to facilitate proper membrane functionality (i.e., capillary condensation) with the main differences being a larger pore size and a higher membrane temperature. As the concentration of water vapor in the feed mixture was increased, the MBMS monitored a decrease in the concentration of both toluene and phenol on the permeate side (FIG. 4), which strongly suggests that a high membrane selectivity for water could be achieved relative to the toluene and phenol vapors. A ~75% reduction in the MBMS ion signal for both phenol and toluene was observed at the highest concentration of feed water vapor (at 780 μL/min flow rate). This enhanced membrane selectivity achieved with a superhydrophilic HiPAS membrane with larger pores suggests that a high selectivity could be preserved even with ~8 nm pores and a higher flux would be expected from the larger pore size membrane.

As the Kelvin equation predicts, a larger pore size and higher membrane temperature require a higher concentration $C_t$ of water vapor for capillary condensation to take place. A membrane having a Kelvin radius of 3 nm or a diameter of 6 nm and a membrane temperature of 80° C. requires approximately 36% water vapor for capillary condensation. This is consistent with the experimental results. Cooling the membrane to a lower temperature (such as 40° C.) would reduce $C_t$, thus improving the membrane's ability to dewater the stream.

Figure 4:
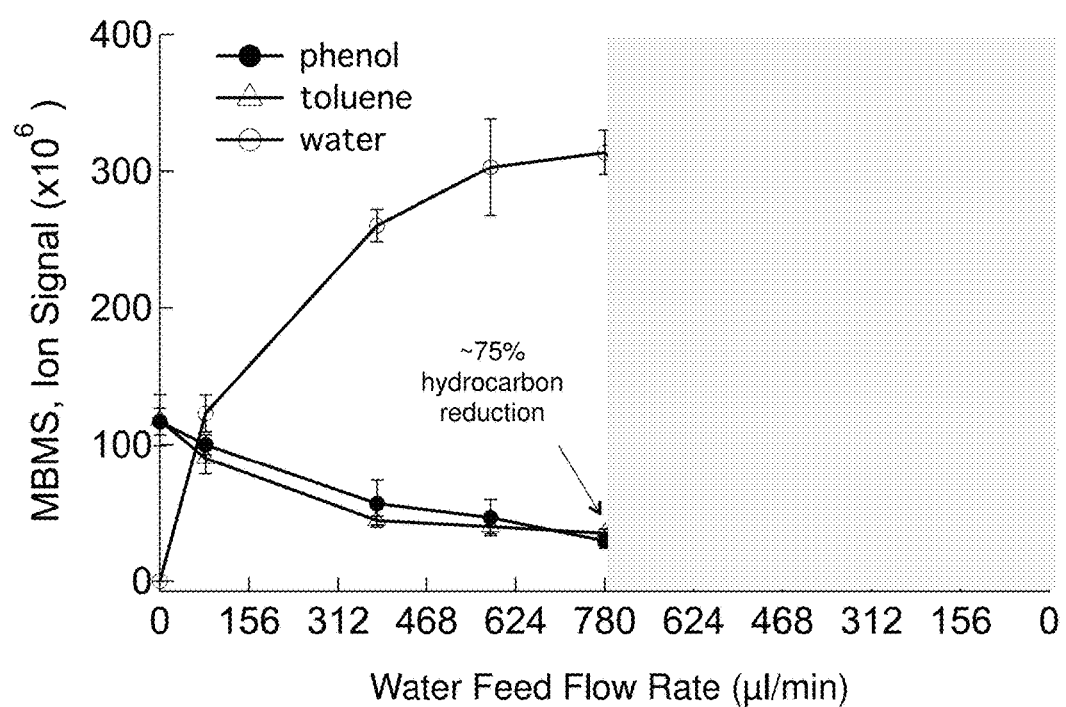
FIG. 4. Graphical plot of vapor phase toluene-phenol-water membrane selectivity data with a superhydrophilic HiPAS membrane (~8 nm pores, membrane #2).

From the data shown in the gray area in FIG. 4, it can be deduced that as the water vapor concentration decreased, the permeance of phenol and toluene increased. Furthermore, a particular finding is that a significantly higher concentration of phenol relative to toluene was observed after the water flow was turned off, which suggests that residual water adsorption in the membrane pores may help enhance (activate) the separation of oxygenates (phenol) from deoxygenates (toluene). Based on the compositional analysis of the data collected for the permeate vapors from the two- and three-component feed mixtures, it has been demonstrated that superhydrophilic membranes can remove water from hydrocarbon mixtures, which may help improve the quality of the hydrocarbon intermediates for downstream processing and hydrotreatment.

Vapor Phase Dehydration of Ethanol-Water Mixtures with HiPAS Membranes Having 6 nm Pores The HiPAS membranes used in this experiment are identified as follows:

TABLE 2

HiPAS membranes used in the vapor phase dehydration of ethanol-water mixtures

| Membrane Types | Membrane Substrates | Surface Coatings | Membrane ID |
| --- | --- | --- | --- |
| Bare alumina-coated Support (hydrophilic) | 4.3-μm porous SS434 tube | 6-nm porous alumina + no surface ligand modification | #0 Baseline tube |
| Superhydrophilic | 4.3-μm porous SS434 tube | 5.79-nm porous alumina + hydroxylated silica aerogel nanoparticle coating | #8 SI-tube |
| Superhydrophobic | 4.3-μm porous SS434 tube | 6.4-nm porous alumina + diatomaceous earth (DE) coating + 1H,1H,2H,2H-perfluoro decyl trimethoxy silane (PDTMS) modification | #12 SO-tube |

Figure 5:
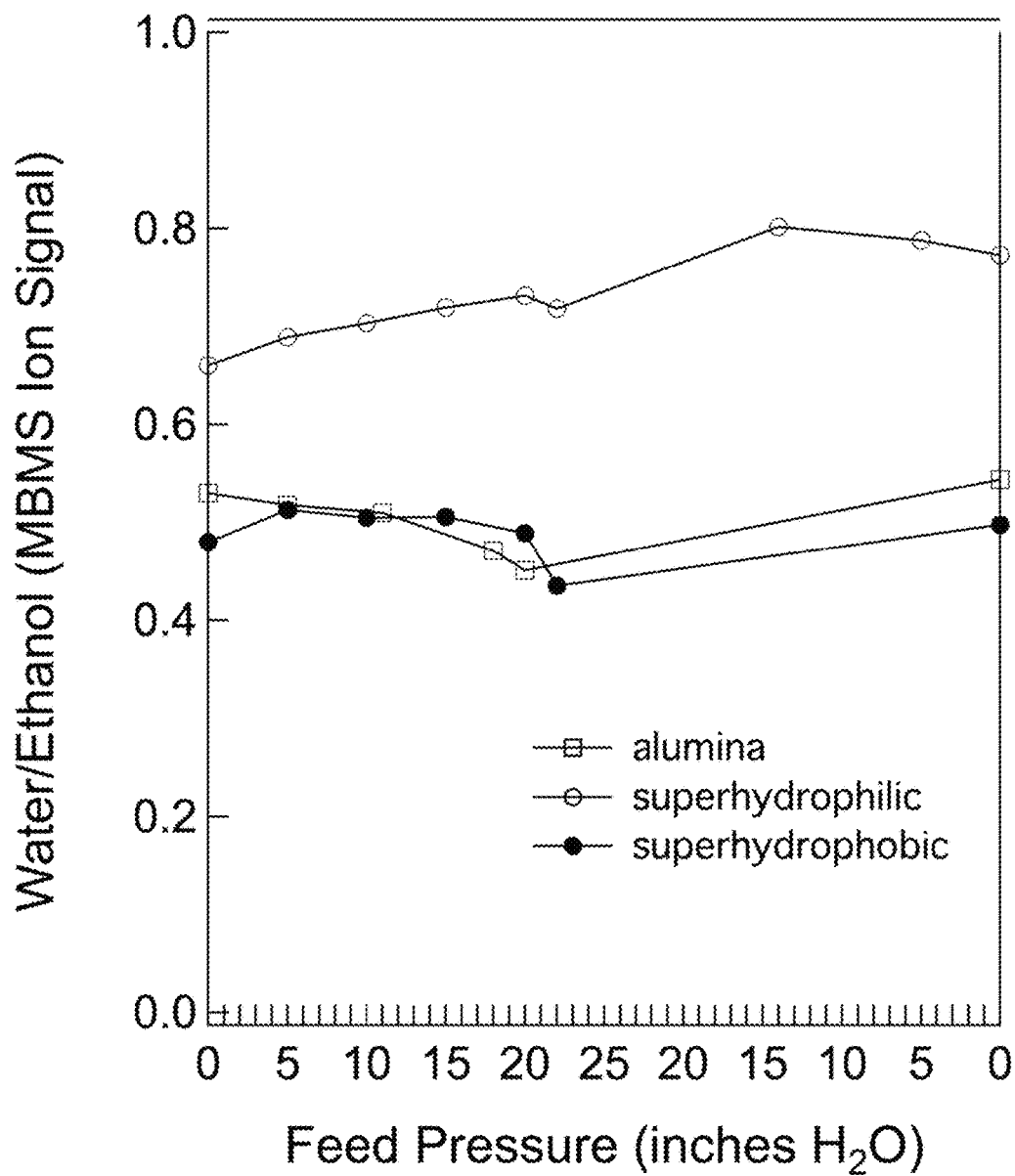
FIG. 5. Graphical plot of vapor phase ethanol-water separation selectivities for three types of membrane surfaces (alumina coated membrane, superhydrophilic, and superhydrophobic surface modified membranes, i.e., membranes #0, #8, and #12, respectively, the compositions of which are provided in Table 2). A molecular beam mass spectrometer (MBMS) was used to monitor the composition of the permeate as a function of feed pressure through a membrane.

All three tested membranes have the same alumina coated mesopores (~6 nm) on identical porous (4.3 μm) SS-434 support tubes but with different surface properties: bare alumina (no coating), superhydrophilic coating, and superhydrophobic coating. The tubular membranes were mounted in a holder so that adjusting the metering valve on the raffinate stream controlled the feed pressure. The ethanol-water mixture (50/50 mixture by volume) was dispensed by a programmable syringe pump into an inert gas stream flowing through a horizontal quartz flow tube reactor heated to 200° C. When vaporized, the gas stream contained approximately 1.88% water vapor by volume and 0.58% ethanol vapor. The concentrations of water and ethanol vapors were analyzed via an in-line molecular beam mass spectrometer (MBMS). The MBMS response was measured for the feed mixture, and the ratio of the signal for water to that of ethanol was approximately 0.48. This vapor mixture was fed into the tubular membranes which were also held at 200° C. The transport of water and ethanol vapors through the membrane (permeate side) was analyzed via the MBMS. FIG. 5 is a plot of the vapor phase ethanol-water separation selectivities for the three types of membrane surfaces (alumina coated membrane, superhydrophilic, and superhydrophobic surface-modified membranes, i.e., membranes #0, #8, and #12, respectively) as a function of feed pressure through the membrane.

Because the MBMS system operates under a slight vacuum, the permeate stream was always at less than atmospheric pressure. In order to vary the driving force for the membrane permeability, i.e., the pressure difference or transmembrane pressure across the membrane, the feed pressure was adjusted in the range from atmospheric pressure (represented as 0 inches of water in FIG. 5) to approximately 22 inches of water above atmosphere and back down to zero. From these data, it is evident that the alumina-coated tubular membrane and the superhydrophobic membrane performed in a similar manner except that at low pressure (near 0 inches feed pressure) the water/ethanol ratio for hydrophilic-natured bare alumina-surfaced membrane is consistently higher than for the superhydrophobic membrane. This lower water/ethanol ratio for the superhydrophobic membrane may be due to the repellency of water by the superhydrophobic membrane surface. By comparing the water/ethanol ratio data between superhydrophilic and superhydrophobic membranes, the difference is larger throughout the entire range of transmembrane pressures. The significantly higher water/ethanol ratio for the superhydrophilic membranes may be attributed to the preferential/selective permeation of water to ethanol, due to surface superhydrophilicity.

While there have been shown and described what are at present considered the preferred embodiments of the invention, those skilled in the art may make various changes and modifications which remain within the scope of the invention defined by the appended claims.

What is claimed is:

1. A method of processing a mixture of heated vapors, at least two of which substantially differ in polarity from each other, the method comprising directing said mixture of heated vapors at a temperature of at least 150° C. through a hydrophobic or hydrophilic mesoporous membrane comprising a mesoporous coating of hydrophobized or hydrophilized metal oxide nanoparticles, respectively, wherein the hydrophobic mesoporous membrane permits passage of one or more hydrophobic heated vapors in said mixture of heated vapors and blocks passage of one or more hydrophilic heated vapors in said mixture of heated vapors, and wherein the hydrophilic mesoporous membrane permits passage of one or more hydrophilic heated vapors in said mixture of heated vapors and blocks passage of one or more hydrophobic heated vapors in said mixture of heated vapors.

2. The method of claim 1, wherein the mesoporous membrane is hydrophobic and permits passage of said one or more hydrophobic heated vapors and blocks passage of said one or more hydrophilic heated vapors.

3. The method of claim 1, wherein the mesoporous membrane is hydrophilic and permits passage of said one or more hydrophilic heated vapors and blocks passage of said one or more hydrophobic heated vapors.

4. The method of claim 1, wherein said mixture of heated vapors includes water vapor.

5. The method of claim 4, wherein said water vapor is separated from other less polar gaseous products when said mixture of heated vapors is processed by the mesoporous membrane.

6. The method of claim 5, wherein the mesoporous membrane is hydrophilic and permits passage of water vapor and blocks passage of one or more hydrophobic heated vapors.

7. The method of claim 5, wherein the mesoporous membrane is hydrophobic and permits passage of one or more hydrophobic heated vapors and blocks passage of water vapor.

8. The method of claim 5, wherein at least 85% of the water in the mixture of heated vapors is separated from other less polar gaseous products.

9. The method of claim 5, wherein at least 90% of the water in the mixture of heated vapors is separated from other less polar gaseous products.

10. The method of claim 1, wherein said temperature is at least 200° C.

11. The method of claim 1, wherein said temperature is at least 250° C.

12. The method of claim 1, wherein said heated vapors emanate from a pyrolysis process.

13. The method of claim 12, wherein said pyrolysis process comprises thermally decomposing organic material into a mixture of heated gaseous products, at least two of which substantially differ in polarity from each other.

14. The method of claim 13, wherein said organic material is a hydrocarbon and said pyrolysis process is a hydrocarbon combustion process.

15. The method of claim 14, wherein said hydrocarbon is a petrochemical fuel.

16. The method of claim 13, wherein said organic material is a petrochemical fuel and said mixture of heated gaseous products is from an exhaust stream of an engine.

17. The method of claim 16, wherein said exhaust stream further comprises water as a combustion byproduct, and said water is separated from other less polar gaseous products when said exhaust stream is processed by the mesoporous membrane.

18. The method of claim 13, wherein said pyrolysis process is a biomass pyrolysis process.

19. The method of claim 13, wherein said pyrolysis process is a biofuel production process.

20. The method of claim 19, wherein said biofuel production process comprises a biomass pyrolysis step followed by an upgrading step followed by a fractionation step.

21. The method of claim 20, wherein said mesoporous membrane is integrated in the biofuel production process by being located between the pyrolysis and upgrading steps and/or between the upgrading and fractionation steps.

22. The method of claim 21, wherein the mixture of heated gaseous products emanating from said pyrolysis step or said upgrading step includes water as a combustion byproduct, and said water is separated from other less polar gaseous products when said mixture of heated gaseous products is processed by the mesoporous membrane.

23. The method of claim 22, wherein the mesoporous membrane is hydrophilic and permits passage of water vapor and blocks passage of one or more hydrophobic gaseous products.

24. The method of claim 22, wherein the mesoporous membrane is hydrophobic and permits passage of one or more hydrophobic gaseous products and blocks passage of water vapor.

25. The method of claim 22, wherein at least 85% of the water in the mixture of heated gaseous products is separated from other less polar gaseous products.

26. The method of claim 22, wherein at least 90% of the water in the mixture of heated gaseous products is separated from other less polar gaseous products.

27. An apparatus useful for the separation of heated vapors in a mixture of heated vapors wherein at least two of the heated vapors substantially differ in polarity from each other, the apparatus comprising a vapor production chamber that contains a heating element and is integrally connected with a hydrophobic or hydrophilic mesoporous membrane comprising a mesoporous coating of hydrophobized or hydrophilized metal oxide nanoparticles, respectively, wherein the hydrophobic mesoporous membrane permits passage of one or more hydrophobic heated vapors in said mixture of heated vapors and blocks passage of one or more hydrophilic heated vapors in said mixture of heated vapors, and wherein the hydrophilic mesoporous membrane permits passage of one or more hydrophilic heated vapors in said mixture of heated vapors and blocks passage of one or more hydrophobic heated vapors in said mixture of heated vapors.

28. The apparatus of claim 27, wherein said vapor production chamber is a pyrolysis chamber.

29. The apparatus of claim 28, wherein said pyrolysis chamber is a fuel-burning engine.

* * * * *